US009338204B2

United States Patent
Yeh

(10) Patent No.: US 9,338,204 B2
(45) Date of Patent: May 10, 2016

(54) PRIORITIZED SIDE CHANNEL DELIVERY FOR DOWNLOAD AND STORE MEDIA

(71) Applicant: MobiTV, Inc., Emeryville, CA (US)

(72) Inventor: James Yeh, Berkeley, CA (US)

(73) Assignee: MobiTV, Inc., Emeryville, CA (US)

( * ) Notice: Subject to any disclaimer, the term of this patent is extended or adjusted under 35 U.S.C. 154(b) by 487 days.

(21) Appl. No.: 13/749,932

(22) Filed: Jan. 25, 2013

(65) Prior Publication Data

US 2014/0215017 A1    Jul. 31, 2014

(51) Int. Cl.
| | |
|---|---|
| G06F 15/16 | (2006.01) |
| H04L 29/06 | (2006.01) |
| H04L 29/08 | (2006.01) |
| H04N 21/2343 | (2011.01) |
| H04N 21/24 | (2011.01) |
| H04N 21/258 | (2011.01) |

(52) U.S. Cl.
CPC ............ *H04L 65/60* (2013.01); *H04L 65/4084* (2013.01); *H04L 65/4092* (2013.01); *H04L 65/608* (2013.01); *H04L 65/80* (2013.01); *H04L 67/02* (2013.01); *H04N 21/2343* (2013.01); *H04N 21/234309* (2013.01); *H04N 21/234327* (2013.01); *H04N 21/234345* (2013.01); *H04N 21/2402* (2013.01); *H04N 21/25825* (2013.01); *H04N 21/25833* (2013.01)

(58) Field of Classification Search
CPC .......... H04N 19/61; H04N 21/234327; H04N 19/70; H04N 19/187; H04N 19/33
See application file for complete search history.

(56) References Cited

U.S. PATENT DOCUMENTS

| | | | |
|---|---|---|---|
| 6,522,650 B1 * | 2/2003 | Yonge et al. ................. | 370/390 |
| 2001/0016008 A1 * | 8/2001 | Bahl et al. ................. | 375/240.18 |
| 2004/0100586 A1 * | 5/2004 | Li et al. ......................... | 348/584 |
| 2004/0162078 A1 * | 8/2004 | Ramaswamy et al. ........ | 455/445 |
| 2012/0170523 A1 * | 7/2012 | Civanlar ....................... | 370/329 |

OTHER PUBLICATIONS

"Advanced video coding for generic audiovisual services", ITU-T Rec. H.264 (May 2003), Retrieved from Internet <http://www.itu.int/rec/dologin_pub.asp?lang=e&id=T-REC-H.264-200305-S!!PDF-E &type=items>, May 2003, 282 pgs.

Schwarz, Heiko et al., "Overview of the Scalable Video Coding Extension of the H.264/AVC Standard", IEEE Transaction on Circuits and Systems for Video Technology, vol. 17, No. 9, Sep. 2007, Retrieved from Internet <http://ip.hhi.de/imagecom_G1/assets/pdfs/Overview_SVC_IEEE07.pdf> , Sep. 2007, 18 pgs.

(Continued)

*Primary Examiner* — Peling Shaw
(74) *Attorney, Agent, or Firm* — Kwan & Olynick LLP

(57) ABSTRACT

Techniques and mechanisms described herein facilitate the delivery of prioritized side channel data to a client machine. According to various embodiments, base layer data may be transmitted to the client machine. The base layer data may include a plurality of base layer data segments. The base layer data segments may be capable of being used to present a media content item at a first quality level. Side channel data may be transmitted to the client machine. The side channel data may include a plurality of side channel data segments. Each side channel data segment may correspond with a base layer data segment. The side channel data segments may be capable of being combined with the corresponding base layer data segments to present the media content item at second quality level. The second quality level may be being greater than the first quality level.

14 Claims, 9 Drawing Sheets

(56) References Cited

OTHER PUBLICATIONS

Sullivan, Gary J. et al., "Video Compression—From Concepts to the H.264/AVC Standard", Proceedings of the IEEE, vol. 93, No. 1, Jan. 2005, Retrieved from Internet <http://ip.hhi.de/imagecom_G1/assets/pdfs/pieee_sullivan_wiegand_2005.pdf>, Jan. 2005, 14 pgs.

Wiegand, Thomas et al., "Overview of the H.264/AVC Video Coding Standard", IEE Transaction on Circuits and Systems for Video Technology, vol. 13, No. 7, Jul. 2003, Retrieved from Internet <http://ip.hhi.de/imagecom_G1/assets/pdfs/csvt_overview_0305.pdf>, Jul. 2003, 17 pgs.

* cited by examiner

PRIORITIZED SIDE CHANNEL DELIVERY FOR DOWNLOAD AND STORE MEDIA

TECHNICAL FIELD

The present disclosure relates to the encoding and delivery of downloadable media content.

DESCRIPTION OF RELATED ART

In some media systems, a user may download and store a media content item such as a video to view immediately or at a later time. The media content may include one or more files that are stored on the user's computing device. The computing device may be a mobile phone, a desktop computer, a laptop, a tablet computer, a smart television, a digital video recorder, or any other type of computing device.

Often, a content provider possesses a copy of the media content item that is encoded at a much higher quality than is practical to send to a client machine. For instance, many full quality content items would require an excessive amount of bandwidth to transmit to the client machine and/or an excessive amount of storage space to store at the client machine. Moreover, many client devices are not capable of taking advantage of relatively high quality due to limitations in characteristics such as screen resolution and audio quality. Additionally, some client devices may not have the computational power, available memory, software capabilities, or other characteristics necessary to present media that exceeds a given bitrate or that fits a given media content profile. When providing media content for downloading by client machines, a tradeoff must often be made between file size and quality. The content provider can transcode the media content item to produce an encoding that is of a size and quality appropriate for transmission to the client machine. In general, a larger file size corresponds with a relatively higher quality, but also with relatively higher storage space requirements and transmission bandwidth volume.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
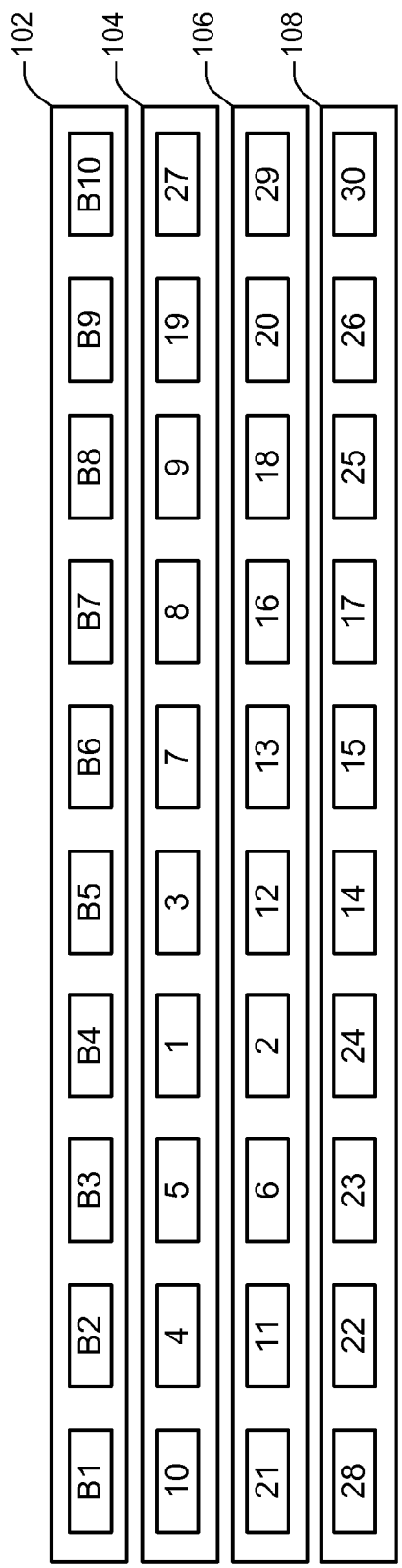
FIG. 1 illustrates one example of a media content item fragment array, configured in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate the transmission of media at various quality levels. A media content item such as a video and/or audio media item may be downloaded to a client machine at an initial quality level. Then, the quality of the downloaded content may be improved by downloading supplemental or "side channel" data. This side channel data may be used to improve the quality of some or all of the downloaded content. In particular embodiments, the side channel data may be downloaded in a queue or in layers so that the quality of the downloaded content may be continuously improved up to a designated quality level. Downloading side channel data in this fashion may allow the content of an initial, relatively lower quality downloaded media content item to be improved without requiring that an entirely different, relatively higher quality, separate encoding of the media content item be downloaded, thus saving bandwidth costs and download time.

Example Embodiments

According to various embodiments, users may receive content from a content management service. The content management service may facilitate the interaction of users with various types of content services. For instance, the content management service may provide a user interface for managing and accessing content from a number of different content sources. The interface may display content received via a cable or satellite television connection, one or more on-demand-video service providers such as Netflix or Amazon, and content accessible on local or network storage locations. In addition, the interface may be used to access this content on any number of content playback devices.

In a traditional download and store solution, a single file is delivered to a device by a server. Then, when the download is completed, the file is made available for playback. However, according to various embodiments described herein, a media content item may be divided into base layer data and supplemental side channel data. The base layer data may be delivered to a client machine and may allow presentation of the media content item at a base or initial level of quality. Then, the quality may be improved by supplementing the base layer data with side channel data. The side channel data may be arranged such that receiving more side channel data will allow a successively improved quality level up to a threshold quality level. Thus, the quality of the media content item may be continually improved until some threshold quality level is reached, until bandwidth or storage space is unavailable, until a user no longer wishes to receive supplemental side channel data, or until some other criterion is met.

According to various embodiments, the techniques described herein may be used in conjunction with various content delivery techniques. For instance, the Scalable Video Coding technology in the H.264 specification may allow the enhancement of video content after the original base video stream is delivered. However, the techniques described herein are not limited to use in conjunction with the H.264 specification and are instead widely applicable to a range of media content delivery techniques, mechanisms, and frameworks.

According to various embodiments, priority may be determined based on any or all of various factors. For example, media content item segments that are deemed to be of lower quality may be assigned a higher priority for side channel delivery than media content items that are deemed to be of higher quality. Quality may be determined based on any of various metrics, such as quantization parameters associated with the segments. As another example, priority may be defined on the user level, where prioritization of side channel delivery may be based at least in part on user preferences or properties, such as whether the user has viewed the content before. As yet another example, priority may be defined on a substantive basis, where iconic or important scenes or portions of the media content item are selected for higher priority of side channel delivery.

In particular embodiments, a prioritization may be maintained and/or changed if playback of the media content item has already been initiated on the client machine. For instance, segments of the media content item that have not yet been presented may be given considerably higher priority for improvement based on side channel delivery than segments that have already been presented.

In particular embodiments, the use of side channel delivery may reduce the amount of storage needed to store an encoded media content item. When using side channel delivery, different encodings of the same content item may be stored as a base layer data with different levels of supplemental side channel data. In contrast, traditional content delivery techniques involve storing a standalone copy of the content item for each separate encoding.

For example, consider a simplified example where a content provider wishes to store a content item with two encodings, one that includes the base layer "A" and another that includes both the base layer "A" and the additional quality layer "B". If these encodings were to be stored separately, the content provider would need to separately store the encoding "A" and the encoding "A+B". In contrast, if side channel delivery is used, then the content provider would need to store only the base layer "A" and the side channel "B". To provide the encoding "A+B", the content provider could first delivery the base layer "A" and then deliver the side channel "B" rather than sending a single encoding "A+B".

In particular embodiments, the use of side channel delivery may allow for possible finer-grained encodings. For instance, different encodings may be delivered to different client devices since different client devices may vary in characteristics such as bandwidth costs, bandwidth availability, storage space, screen resolution, audio capabilities, video rendering capabilities, and other such properties. In such situations, the use of prioritized side channel delivery may allow a reduction of bandwidth usage. For instance, a content provide may be prepared to delivery up to a quality level "N", which would take "M" bits of bandwidth to deliver. However, a user may begin watching the content item after the base layer data has been delivered but well before the quality of the content has reached level "N" (i.e. well before all of the available side channel data has been delivered). In this case, the content provider would have delivered strictly less than "M" bits, resulting in a reduction in bandwidth usage.

In particular embodiments, techniques and mechanisms described herein may be used for any streaming format that relies on the transfer of small files or file segments. However, the techniques and mechanisms are generally applicable to a wide range of video content technologies. In particular embodiments, the media content item may be encoded via the H.264 or H.265 standard as an MPEG video. Alternately, the media content item may be encoded via any other encoding scheme that allows a media content item to be encoded into a base layer and one or more side channel layers that can supplement the base layer data.

Although the content is often referred to herein as video content, the techniques and mechanisms described herein are generally applicable to a wide range of content and content distribution frameworks. For example, the content may be media content such as video, audio, or image content.

The storage capacity, write speed, read speed, and other characteristics described herein are included for the purpose of clarity and to provide examples. Computer hardware, software, and networking characteristics change over time. Nevertheless, the techniques described herein are widely applicable to storage systems and frameworks having various hardware, software, and networking characteristics.

FIG. 1 illustrates one example of a media content item fragment array, configured in accordance with one or more embodiments. According to various embodiments, a media content item may be segmented in a manner similar to that shown in FIG. 1 in order to facilitate transfer to a client machine. The media content item fragment array shown in FIG. 1 includes four layers, the base layer 102 and the side channel layers 104, 106, and 108.

According to various embodiments, a media content item such as that represented in FIG. 1 may be separated into segments, which are also referred to herein as fragments. Each segment may correspond with a portion of the media content item, such as 10 seconds, 2 minutes, or some other period of content. The media content item shown in FIG. 1 is separated into ten segments. However, media content items may be separated into any number of segments. For instance, a lengthy content item such as a movie may be separated into thousands of segments.

According to various embodiments, separating a media content item into segments may allow the media content item to be downloaded more easily by a client machine. Instead of downloading a large, monolithic file, the client machine may instead download these separate segments. In some instances, this may allow the client machine to begin playback of the media content item more quickly since the client machine need not download the content in its entirety before beginning playback. Alternately, or additionally, separating the media content item into segments may allow the client machine to more easily terminate and resume downloads.

According to various embodiments, each segment of a media content item may be divided into a base layer and some number of additional side channel layers. The media content item shown in FIG. 1 is separated into a base layer 102 and the three side channel layers 104, 106, and 108. However, other media content items may be separated in a way that includes various numbers of side channel layers, such as one, five, or ten side channel layers. Furthermore, a media content item need not necessarily have the same number of side channel layers for each segment. For instance, some segments may be separated into a base layer and a relatively small number of side channel layers, while other segments may be separated into a base layer and a relatively large number of side channel layers.

According to various embodiments, the base layer 102 of the media content item includes the information necessary to present the media content item at a base or initial level of quality. That is, once the client machine has received and stored base layer data for a particular segment of the content item, the client machine is equipped to present that segment of the content item.

In FIG. 1, the labels for the base layer segments included in the base layer 102 correspond to the order of the base layer segments in the presentation of the media content item. For instance, the base layer segment "B1" corresponds to the first portion of the media content item, while the base layer segment "B10" corresponds to the last portion of the media content item.

According to various embodiments, each side channel layer for a given media content item segment supplements the quality of the base layer. For instance, if the client machine has received the base layer segment "B4" shown in FIG. 1, then the client machine is equipped to present the portion of the media content item corresponding to the segment B4 at a base or initial quality level. However, if the client machine has also received the side channel segment "1" shown in FIG. 4, then the client machine is equipped to present the corresponding portion of the media content item at a greater quality level than would be possible if the client machine possessed only the base layer segment B4. Techniques for delivering side channel data are discussed in further detail with respect to FIG. 6.

In FIG. 1, the labels for the side channel segments included in the side channel layers 104, 106, and 108 correspond with a prioritization of the side channel data. Lower numbers correspond with side channel segments that have a higher priority for transmission to the client machine to supplement the base layer data. For instance, the side channel layer segment "1" has the highest priority, while the side channel layer segment "30" has the lowest priority.

In particular embodiments, each side channel layer segment builds upon the previous level or levels. For each side channel layer segment, the previous level or levels includes at least the corresponding base layer segment. In addition, some side channel layer segments also build upon other side channel layer segments. For instance, in FIG. 1, the side channel layer segment "3" supplements the base layer segment "B5", while the side channel layer segment "12" supplements both the base layer segment "B5" and the side channel layer segment "3". That is, in order to employ the data in the side channel layer segment "12", the client machine needs both the base layer segment "B5" and the side channel layer segment "3". Accordingly, in FIG. 1, each side channel segment has a strictly larger prioritization than any side channel segment above it, if one exists. For instance, for the base layer segment B3, the prioritization of the corresponding side channel layer segments increases from "5" to "6" to "23".

According to various embodiments, the ordering of the side channel layer segments may be determined based on various criteria for selectively improving the quality of the media content item as presented at the client machine.

For instance, side channel layer segments may be prioritized based on the relative quality of the corresponding media content segment as represented by the data already downloaded to the client machine, the relative importance of the corresponding media content segment to the presentation of the media content item. According to various embodiments, a prioritization for a media content item may be determined on a per-user basis, on a per-content-item basis, for a group of users, or on any other basis. Techniques for the determination of a prioritization for side channel data are discussed in further detail with respect to FIG. 5.

Figure 2:
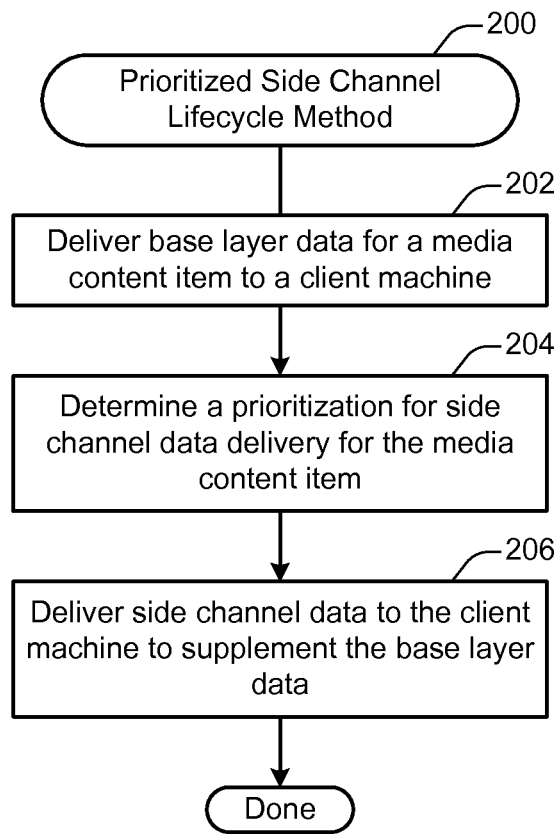
FIG. 2 illustrates an example of a side channel delivery lifecycle method that may be used in conjunction with various techniques and mechanisms of the present invention.

FIG. 2 illustrates an example of a side channel delivery lifecycle method 200 that may be used in conjunction with various techniques and mechanisms of the present invention. According to various embodiments, the method 200 may be performed at a server in communication with a client machine. The server may be configured to provide media content management and delivery services to a various client machines in communication with the server. Examples of systems that may be used in conjunction with the method 200 are shown in FIGS. 3, 4, 7, and 8.

According to various embodiments, the method 200 may be used to provide a media content item to the client machine. The client machine may download a base layer of data for the media content item. The server may determine a prioritization for side channel data delivery for the media content item. Then, the client machine may download side channel data to supplement the base layer data.

At 202, base layer data for the media content item is delivered to the client machine. According to various embodiments, the base layer data may be stored for viewing at the client machine. Base layer data is discussed with respect to the base layer data 104 shown in FIG. 1. As discussed with respect to FIG. 1, the base layer data may allow the client machine to present the media content item at an initial quality level.

At 204, a prioritization for side channel delivery is determined. According to various embodiments, the prioritization for side channel delivery may specify an ordering or a relative importance of data that may be used to supplement the base layer data. For example, some portions of the media content item may be relatively well-represented by the base layer data, while other portions of the media content item base layer data may exhibit relatively low quality. As another example, some portions of the media content item represented by the base layer data may be relatively important to the presentation, while other portions may be relatively unimportant. The determination of the prioritization may involve selecting relatively lower quality portions and/or relatively more important portions as higher priorities for receiving supplemental side channel data. Techniques for the determination of a prioritization for side channel data are discussed in further detail with respect to FIG. 5.

At 206, side channel data is delivered to the client machine to supplement the base layer data. According to various embodiments, the side channel data may be used to improve the quality of some or all of the base layer data. For instance, as shown in FIG. 1, base layer data for a particular segment of the media content item may be supplemented with additional side channel data that can be used by the client machine to improve the quality of that segment. Techniques for delivering side channel data are discussed in further detail with respect to FIG. 6.

According to various embodiments, the operations performed in the method 200 may be performed in a different order. For instance, the prioritization for side channel data delivery may be performed before the delivery of the base layer data. The prioritization for side channel delivery may be performed on a per-user basis, on a per-content-item basis, or on any other basis.

Figure 3:
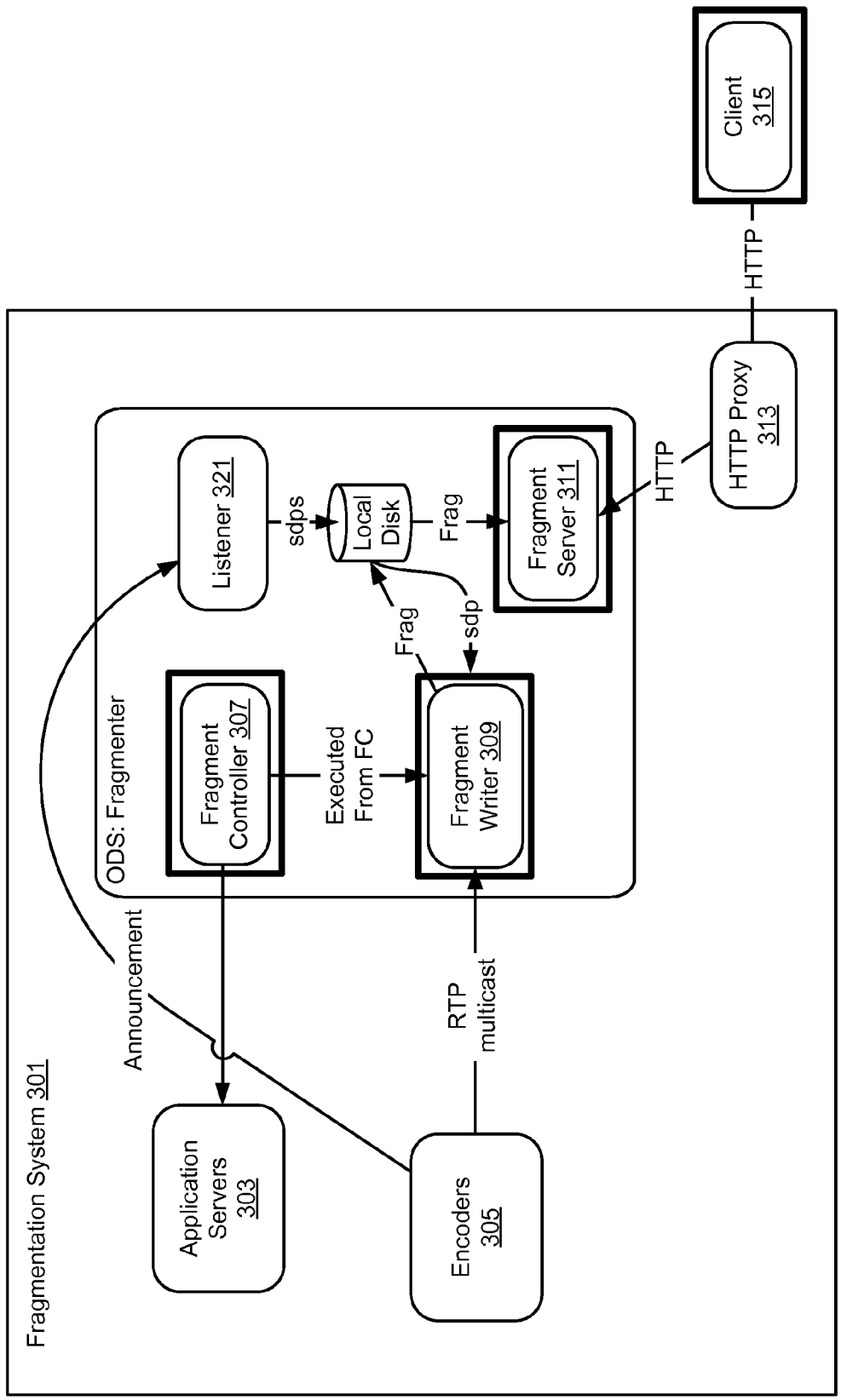
FIGS. 3 and 4 illustrate examples of systems that can be used with various techniques and mechanisms of the present invention.

FIG. 3 is a diagrammatic representation illustrating one example of a fragment or segment system 301 associated with a content server that may be used in a broadcast and unicast distribution network. Encoders 305 receive media data from satellite, content libraries, and other content sources and sends RTP multicast data to fragment writer 309. The encoders 305 also send session announcement protocol (SAP) announcements to SAP listener 321. According to various embodiments, the fragment writer 309 creates fragments for live streaming, and writes files to disk for recording. The fragment writer 309 receives RTP multicast streams from the encoders 305 and parses the streams to repackage the audio/video data as part of fragmented MPEG-4 files. When a new program starts, the fragment writer 309 creates a new MPEG-4 file on fragment storage and appends fragments. In particular embodiments, the fragment writer 309 supports live and/or DVR configurations.

The fragment server 311 provides the caching layer with fragments for clients. The design philosophy behind the client/server application programming interface (API) minimizes round trips and reduces complexity as much as possible when it comes to delivery of the media data to the client 315. The fragment server 311 provides live streams and/or DVR configurations.

The fragment controller 307 is connected to application servers 303 and controls the fragmentation of live channel streams. The fragmentation controller 307 optionally integrates guide data to drive the recordings for a global/network DVR. In particular embodiments, the fragment controller 307 embeds logic around the recording to simplify the fragment writer 309 component. According to various embodiments, the fragment controller 307 will run on the same host as the fragment writer 309. In particular embodiments, the fragment controller 307 instantiates instances of the fragment writer 309 and manages high availability.

According to various embodiments, the client 315 uses a media component that requests fragmented MPEG-4 files, allows trick-play, and manages bandwidth adaptation. The client communicates with the application services associated with HTTP proxy 313 to get guides and present the user with the recorded content available.

Figure 4:
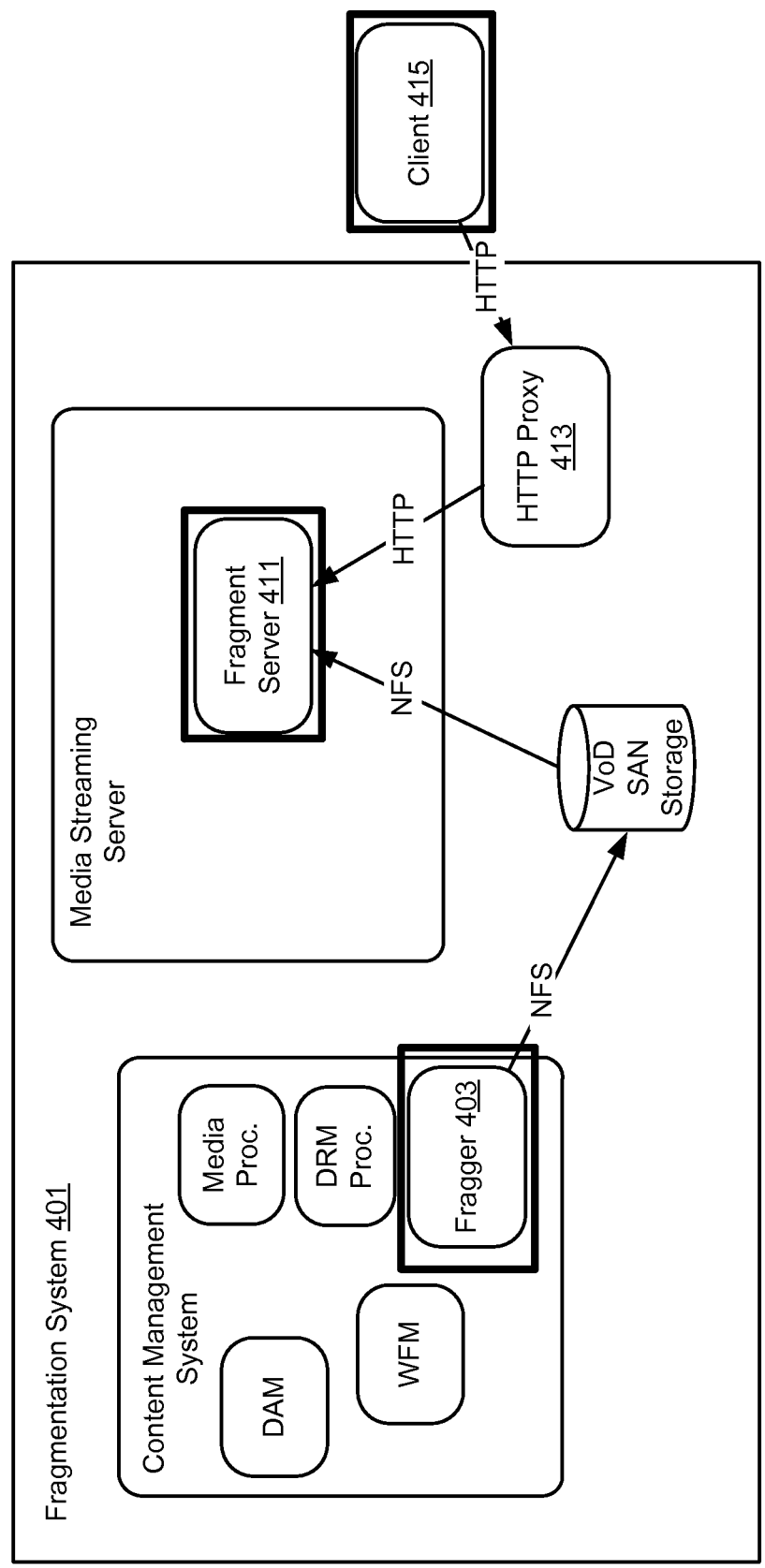

FIG. 4 illustrates one example of a fragmentation system 401 that can be used for video-on-demand (VoD) content. Fragger 406 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 411 provides the caching layer with fragments for clients. The design philosophy behind the client/server API minimizes round trips and reduces complexity as much as possible when it comes to delivery of the media data to the client 415. The fragment server 411 provides VoD content.

According to various embodiments, the client 415 uses a media component that requests fragmented MPEG-4 files, allows trick-play, and manages bandwidth adaptation. The client communicates with the application services associated with HTTP proxy 413 to get guides and present the user with the recorded content available.

Figure 5:
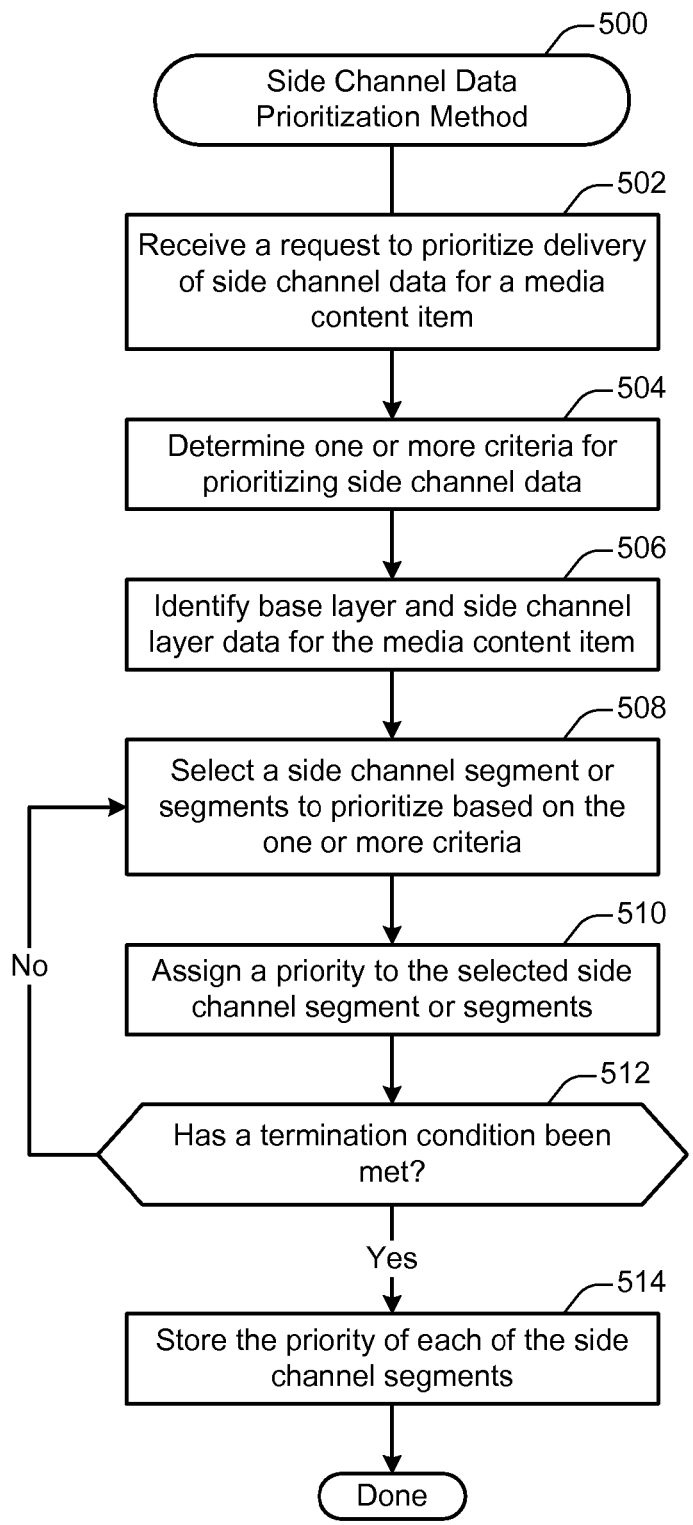
FIG. 5 illustrates an example of a side channel data prioritization method.

FIG. 5 illustrates an example of a side channel data prioritization method 500. According to various embodiments, the method 500 may be performed at a computing system in communication with a client machine. For instance, the computing system may include one or more components discussed with respect to FIG. 3, 4, 7, or 8. The computing system may be configured to provide various media content management services.

According to various embodiments, the method 500 may be used to analyze an encoding of a media content item to determine an ordering or priority for transmitting side channel data included in the encoding to a client machine. As discussed with respect to FIGS. 1 and 2, the ordering or priority may be determined so as to make the best use out of data transmitted to the client machine. For instance, side channel data segments that would significantly improve the quality of relatively low quality content segments at the client machine may be given priority over segments that would be presented in relatively high quality given the data already possessed by the client machine, for instance with the base layer data or any side channel data that has already been prioritized for transmission to the client machine.

At 502, a request to prioritize delivery of side channel data for a media content item is received. According to various embodiments, delivery of side channel data for a media content item may be determined once for all users, separately for groups of users, individually for groups of users, separately for types of devices, or according to any other grouping. The request may be received in conjunction with a request to access the media content item by a client machine or may be received in advance of such a request.

At 504, one or more criteria for prioritizing side channel delivery are determined. According to various embodiments, the one or more criteria may be used to select the side channel segment or segments that have the next highest priority for transmitting to a client machine to improve the quality of the media content item when presented at the client machine. The criteria may be strategically determined based on some combination of a number of factors, which may include, but are not limited to: the types of devices that may receive the media content item, the bandwidth limitations of the system or the devices, the type of content being provided, and the user or users to whom the content will be provided.

In particular embodiments, the criteria may be selected at least in part based on perceived effectiveness, which may vary between systems, content types, device types, user bases, and other such factors. For instance, the system may prioritize side channel in different ways as an experiment. Then, the system may receive preference data from a number of different users who experience different prioritizations of the content. The system may then learn from the user preferences with a learning algorithm. The learning algorithm may allow the system to automatically or dynamically improve the criteria used to prioritize the side channel data.

According to various embodiments, one example of a criterion for prioritizing side channel data is quality metric information. Quality metric information may be used to assign some objective measure of quality to some set of data for providing the media content item. Segments that are deemed to be of lower quality than other segments may be assigned a higher priority for receiving side channel data to improve quality.

For instance, quality metric information may include a quantization parameter, such as an H.264 quantization parameter, calculated for some or all of the segments of the media content item data. In some systems, a quantization parameter may have a value range, such as from 0 to 51. A quantization parameter may reflect the quality of compression of a particular segment of the media content item. The quantization parameter may be calculated for a base layer data segment and any side channel data segment that has already been prioritized for delivery. For instance, a base layer data segment may have a high quantization parameter value such as 45, indicating a particularly low quality encoding that has lost a considerable amount of detail. However, when the base layer data segment is supplemented with the first layer side channel data segment associated with the base layer data segment, the quantization parameter value may decrease to, for example 33. This information may be used to determine a priority for side channel data delivery by identifying segments of the media content item for which the base layer data segment combined with any associated already prioritized side channel data segments have a relatively high quantization parameter value. In this way, the lower quality segments may be targeted for quality improvement before higher quality segments are targeted.

According to various embodiments, another example of criteria for prioritizing side channel data may be specific to a recipient of the content, such as an individual, a group of individuals, a type of device, or some other such factor. For example, for users who have already seen a particular content item, presenting iconic or important scenes in high quality may be particularly important. However, for users who are less familiar with the content item, presenting the entire content item in an even quality level may be more important. As another example, for some types of devices, such as mobile phones, one measure of content quality may be more important, while a different measure of content quality may be more important for other types of devices, such as televisions. As yet another example, a user account may be associated with quality preferences. The quality preferences may indicate a type or quality or side channel data to receive. For instance, the quality preferences may indicate a desired quality level or a type of quality to emphasize when prioritizing side channel data for delivery.

According to various embodiments, yet another example of a criterion for prioritizing side channel data is relative importance information. Relative importance information may identify portions of a media content item that are more important in some sense than other portions of a media content item. For instance, suppose that the media content item under analysis is a movie in the "Star Wars" franchise. In these movies, some scenes are particularly important or iconic, such as battles or tense dialog exchanges between key characters. Other scenes are less important, such as depictions of scenery, traveling, or large-scale action sequences. The system may determine which scenes are more important based on data received from users, system administrators, or content analysts or by analyzing the media content item based on some objective criteria.

According to various embodiments, still another example of a criterion for prioritizing side channel data is a quality of service guarantee. For instance, administrators of the media system may agree to provide media content of a given quality level. In this case, side channel data may be prioritized so as to satisfy the quality of service guarantee.

At 506, base layer and side channel layer data for the media content item is identified. According to various embodiments, the base layer and side channel layer data may be created by encoding the media content item in accordance with an encoding scheme. For instance, the media content item may be encoded via the H.264 standard as an MPEG video. The encoding may be based on any number of encoding parameters, which may be determined manually or by the media content management system. An example of a media content item separated into base layer data and side channel data layers is shown in FIG. 1.

At 508, a side channel segment or segments are selected to prioritize based on the one or more criteria determined at operation 504. As discussed with respect to operation 504, a variety of criteria may be used alone or in combination to select the side channel segment or segments. In general, the side channel segment or segments are selected that are most in need of quality improvement, given the side channel segments that have already been assigned a prioritization. For instance, a particular base layer segment may be deemed to be relatively important or have a relatively low quality level. However, when supplemented with side channel data segments that have already been assigned a higher prioritization, the quality of that segment may have improved sufficiently so that a different segment has priority for quality improvement.

In particular embodiments, a single side channel data segment may be selected for receiving a prioritization. Alternately, a group of side channel data segments may be selected for receiving the same prioritization. For instance, the system may prioritize side channel data segments in groups of one, five, ten, or any other number.

At 510, a priority is assigned to the selected side channel segment or segments. According to various embodiments, the selected side channel segment or segments may be assigned the highest prioritization that has not yet been assigned. As discussed with respect to FIG. 1, the prioritization may be conceptualized as an ordering for transmitting the side channel data segments to a client machine. In this case, a high prioritization may correspond to a low ordering. So, in this case, the selected side channel segment or segments may be assigned the lowest ordering number that has not yet been assigned. For instance, if 9 side channel segments have already been assigned orderings 1 through 9, the selected side channel segment or segments may receive an ordering of 10. However, the ordering technique shown in FIG. 1 is not the only technique that may be used for assigning prioritization information, and the techniques described herein may be used in conjunction with various schemes for assigning ordering information that may be used by the media system to select side channel data for delivery to client machines.

At 512, a determination is made as to whether a termination condition has been met. According to various embodiments, various types of termination conditions may be used alone or in combination. For example, in some instances each side channel data segment may be assigned some prioritization, so the termination criteria may check to see whether any side channel data segments remain unprioritized. As another example, in some instances the amount of data allocated for transmission to a client machine may be limited, so the termination criteria may check whether the amount of side channel data that has been assigned a prioritization has reached a designated threshold. As yet another example, prioritization may continue until each segment of the media content item has reached a designated quality level, such as a designated quantization parameter. As discussed with respect to the prioritization criteria determined in operation 504, the termination condition or conditions may be strategically determined based on a number of different factors.

At 514, the priority of each of the side channel segments is stored. According to various embodiments, the priority information may be stored on a storage device accessible to the media system. For instance, the priority information may be stored in a database on a hard disk. The priority of the side channel segments may be stored so that the priority information may be used by the media system to select side channel data segments for delivery to a client machine. Techniques for delivering side channel data segments to a client machine are discussed in further detail with respect to FIG. 6.

Figure 6:
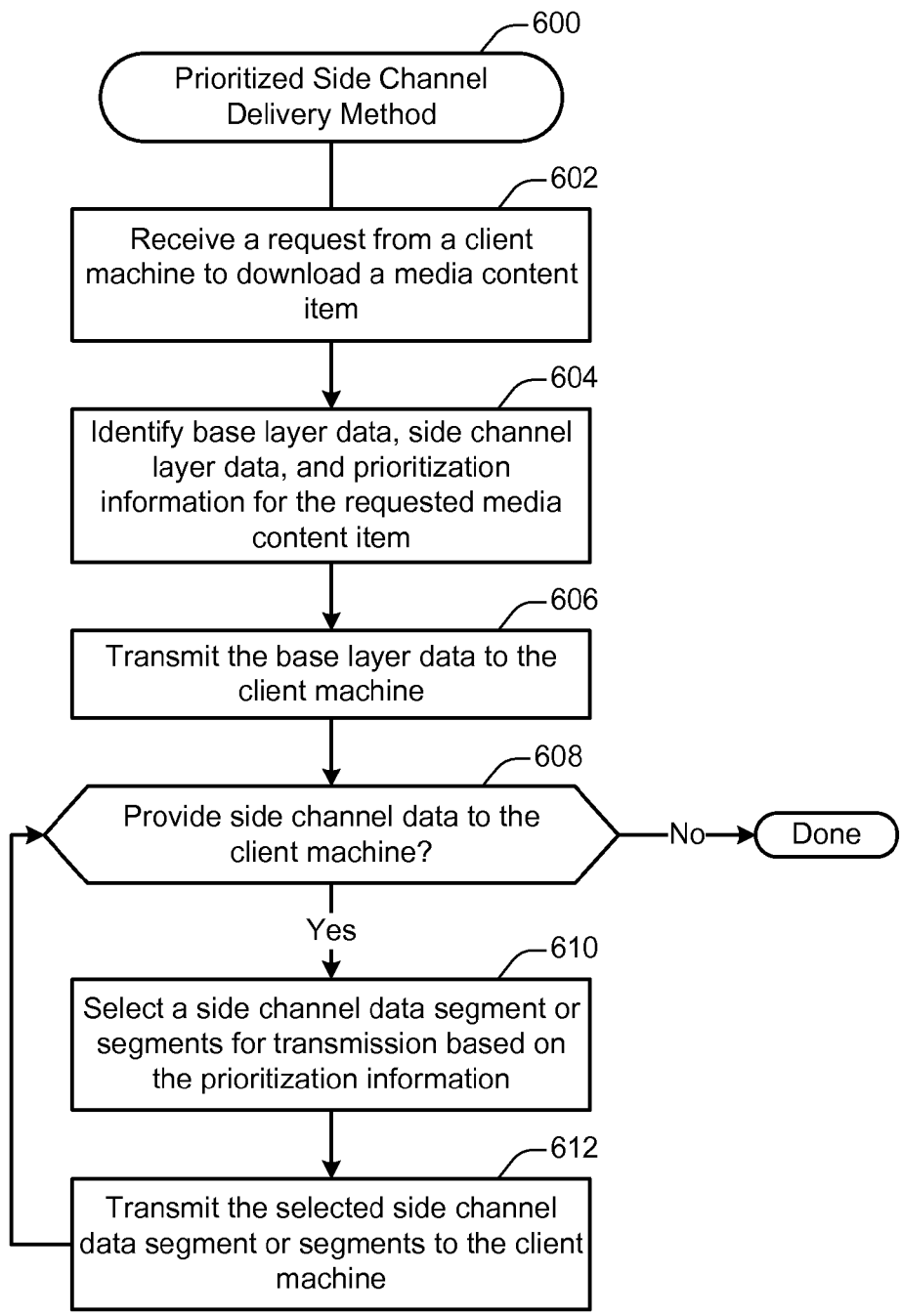
FIG. 6 illustrates an example of a prioritized side channel delivery method.

FIG. 6 illustrates an example of a prioritized side channel delivery method. According to various embodiments, the method 600 may be performed at a computing system in communication with a client machine. For instance, the computing system may include one or more components discussed with respect to FIG. 3, 4, 7, or 8. The computing system may be configured to provide various media content management services.

According to various embodiments, the method 600 may be used to provide data to a client machine based at least in part on prioritization information for the side channel data. The prioritization information may be determined, for instance, as discussed with respect to the method 500 shown in FIG. 5.

At 602, a request is received from a client machine to download a media content item. According to various embodiments, the request may be received at a media system configured to provide media content services to a variety of client machines. As discussed herein, the client machine may be any of various types of computing devices. The request may indicate a desire to receive and store the media content item for later presentation at the client machine.

In particular embodiments, the request received at operation 602 may include information identifying the requestor to the media system. For instance, the request may include a cookie or other authentication or identification information. The information may identify the sender of the request as being associated with a content management account known to the media system. The system may use the information to perform one or more authentication operations, such as determining whether the requestor is authorized to receive the requested media content item.

At 604, base layer data, side channel layer data, and prioritization information for the requested media content item is identified. As discussed with respect to operation 506 shown in FIG. 5, according to various embodiments, the base layer and side channel layer data may be created by encoding the media content item in accordance with an encoding scheme. According to various embodiments, any encoding scheme may be used that allows a media content item to be encoded into a base layer and one or more side channel layers that can supplement the base layer data. For example, in particular embodiments the media content item may be encoded via the H.264 or H.265 standard as an MPEG video. The prioritization information may be determined as discussed with respect to FIG. 5 or via other prioritization techniques.

At 606, the base layer data is transmitted to the client machine. According to various embodiments, the segment or segments may be transmitted via a network such as the Internet, a cable television network, a satellite television network, or any other communications network.

At 608, a determination is made as to whether to provide side channel data to the client machine. According to various embodiments, various criteria may be used for making the determination. For example, the determination may involve analyzing bandwidth limitations for communicating with the client machine. As another example, the determination may involve determining whether a quality of service guarantee associated with providing content to the client machine is satisfied. As yet another example, the determination may involve determining whether playback of the content item has begun or has already concluded at the client machine.

At 610, a side channel data segment or segments are selected for transmission to the client machine based on the prioritization information identified at operation 604. As discussed herein, for instance with respect to FIGS. 1 and 5, different side channel data segments may be assigned different orderings or priorities for transmission to the client machine. Selecting a segment or segments for transmission may involve, for instance, identifying a segment or segments that has the highest priority or lowest ordering among those segments that have not yet been transmitted to the client machine. Alternately, or additionally, selecting a segment or segments for transmission may involve, for instance, determining whether playback of the content item has already begun or has already concluded at the client machine. For example, if playback of the media content item has already been initiated, then side channel data segments associated with portions of the media content item that have not yet been presented may be given higher priority for transmission than side channel data segments associated with portions of the media content item that have already been presented.

At 612, the selected side channel data segment or segments are transmitted to the client machine. According to various embodiments, the segment or segments may be transmitted via a network such as the Internet, a cable television network, a satellite television network, or any other communications network.

Figure 7:
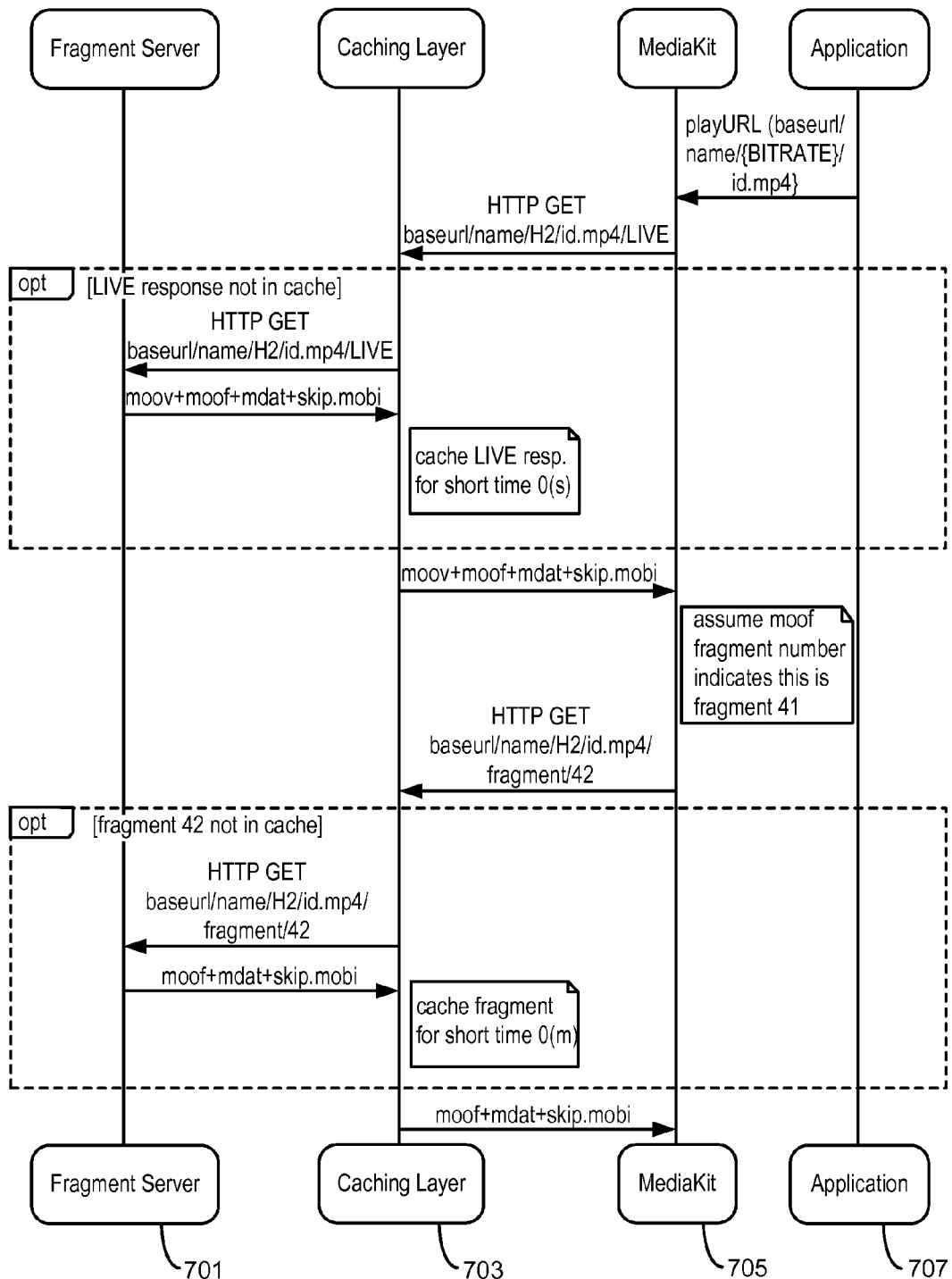
FIG. 7 illustrates one example of an exchange used with a media delivery system.

FIG. 7 illustrates an interaction for a client receiving a media stream such as a live stream. The client starts playback when fragment 41 plays out from the server. The client uses the fragment number so that it can request the appropriate subsequent file fragment. An application such as a player application 707 sends a request to mediakit 705. The request may include a base address and bit rate. The mediakit 705 sends an HTTP get request to caching layer 703. According to various embodiments, the live response is not in cache, and the caching layer 703 forwards the HTTP get request to a fragment server 701. The fragment server 701 performs processing and sends the appropriate fragment to the caching layer 703 which forwards to the data to mediakit 705.

The fragment may be cached for a short period of time at caching layer 703. The mediakit 705 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 705 may request a next fragment having a different data rate. In some instances, the mediakit 705 may request a next fragment having a higher data rate. According to various embodiments, the fragment server 701 maintains fragments for different quality of service streams with timing synchronization information to allow for timing accurate playback.

The mediakit 705 requests a next fragment using information from the received fragment. According to various embodiments, the next fragment for the media stream may be maintained on a different server, may have a different bit rate, or may require different authorization. Caching layer 703 determines that the next fragment is not in cache and forwards the request to fragment server 701. The fragment server 701 sends the fragment to caching layer 703 and the fragment is cached for a short period of time. The fragment is then sent to mediakit 705.

Figure 8:
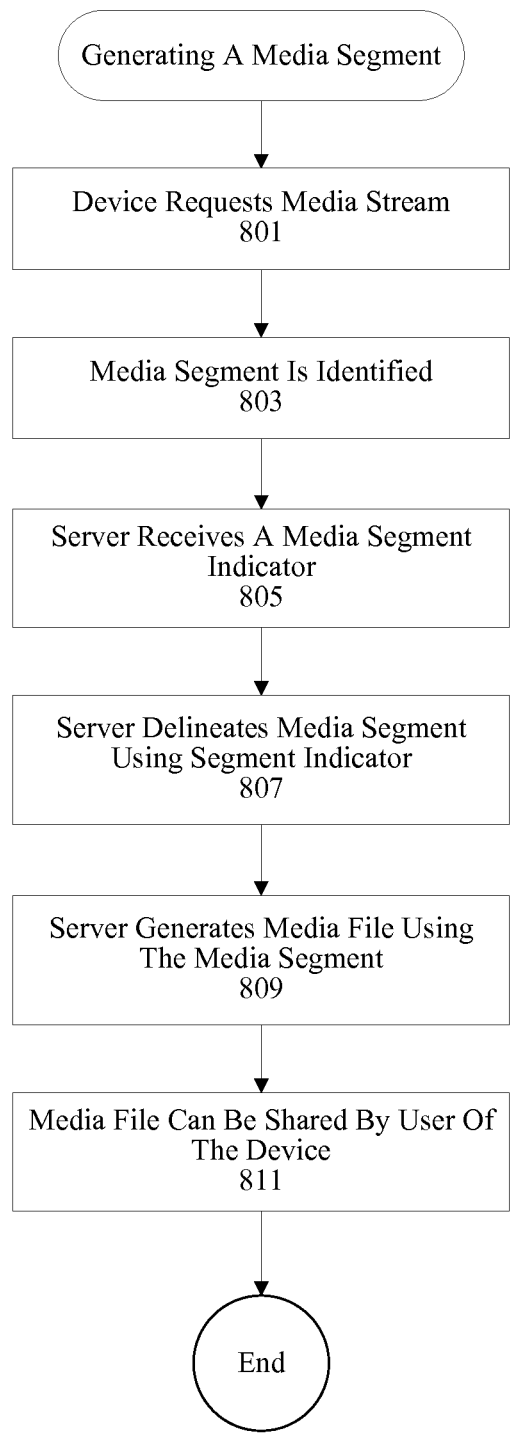
FIG. 8 illustrates one technique for generating a media segment.

FIG. 8 illustrates a particular example of a technique for generating a media segment. According to various embodiments, a media stream is requested by a device at 801. The media stream may be a live stream, media clip, media file, etc. The request for the media stream may be an HTTP GET request with a baseurl, bit rate, and file name. At 803, the media segment is identified. According to various embodiments, the media segment may be a 35 second sequence from an hour long live media stream. The media segment may be identified using time indicators such as a start time and end time indicator. Alternatively, certain sequences may include tags such as fight scene, car chase, love scene, monologue, etc., that the user may select in order to identify a media segment. In still other examples, the media stream may include markers that the user can select. At 805, a server receives a media segment indicator such as one or more time indicators, tags, or markers. In particular embodiments, the server is a snapshot server, content server, and/or fragment server. According to various embodiments, the server delineates the media segment maintained in cache using the segment indicator at 807. The media stream may only be available in a channel buffer. At 809, the server generates a media file using the media segment maintained in cache. The media file can then be shared by a user of the device at 811. In some examples, the media file itself is shared while in other examples, a link to the media file is shared.

Figure 9:
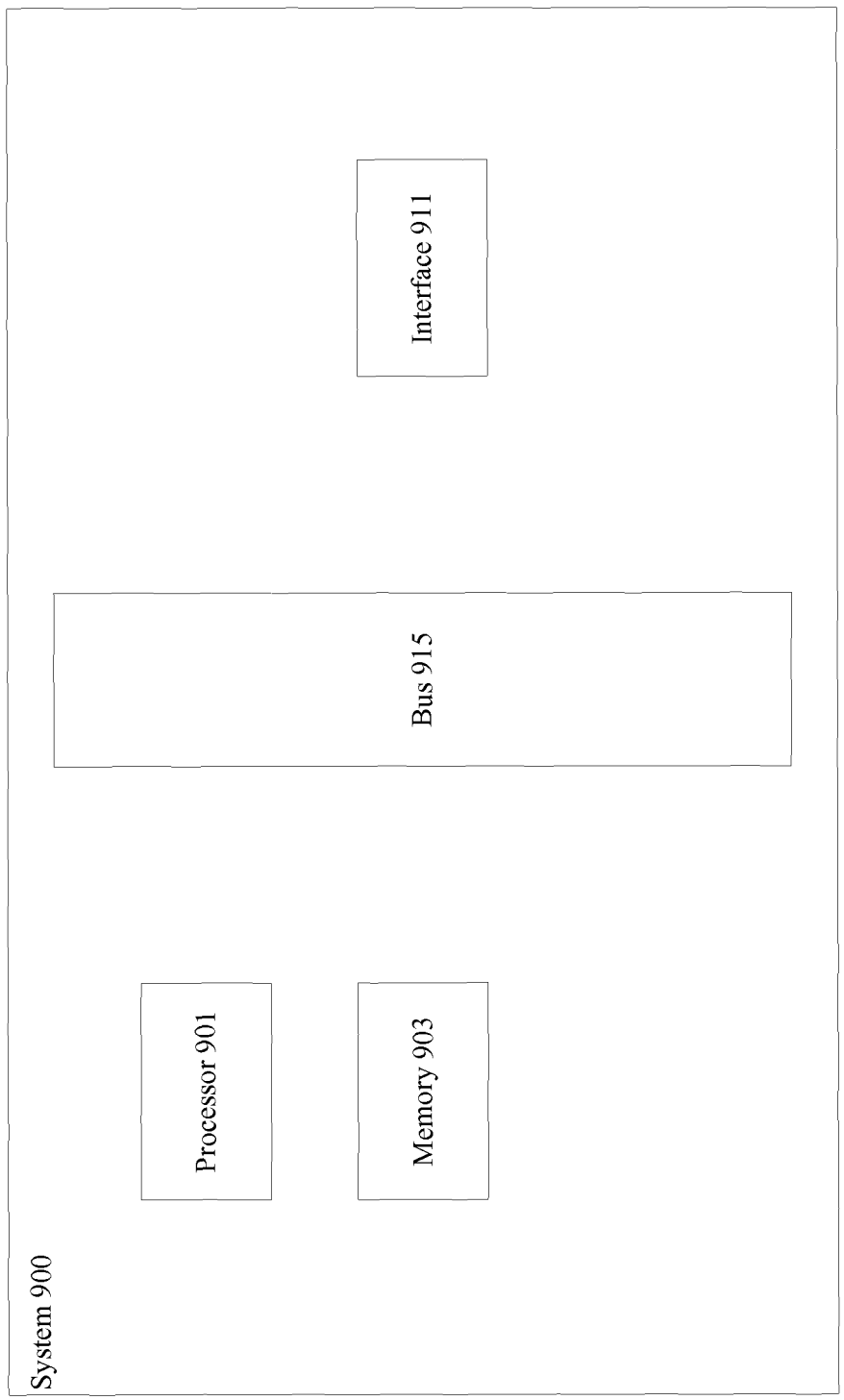
FIG. 9 illustrates an example of a system.

FIG. 9 illustrates one example of a server. According to particular embodiments, a system 900 suitable for implementing particular embodiments of the present invention includes a processor 901, a memory 903, an interface 911, and a bus 915 (e.g., a PCI bus or other interconnection fabric) and operates as a streaming server. When acting under the control of appropriate software or firmware, the processor 901 is responsible for modifying and transmitting live media data to a client. Various specially configured devices can also be used in place of a processor 901 or in addition to processor 901. The interface 911 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 900 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
transmitting base layer video data to a client machine, the base layer video data including a plurality of base layer video data segments, the base layer video data segments capable of being used to present a media content item at a first quality level;
retrieving side channel video data for transmission to the client machine, the side channel video data including a plurality of side channel video data segments, each side channel video data segment corresponding with a base layer video data segment, the side channel video data segments capable of being combined with the corresponding base layer video data segments to present the media content item at second quality level, the second quality level being greater than the first quality level;
determining prioritization data for the side channel video data segments, the prioritization data designating an ordering for transmitting the side channel video data segments to the client machine, wherein the prioritization data is determined at least in part based on one or more characteristics associated with a content management account, the content management account being associated with the client machine; and
transmitting the side channel video data segments in accordance with the prioritization data.

2. The method recited in claim 1, wherein the prioritization data is determined at least in part based on quality metric information, and wherein the quality metric information characterizes the quality of the media content item based on the data layer data transmitted to the client machine.

3. The method recited in claim 2, wherein the quality metric information also characterizes the quality of the media content item based on the side channel video data transmitted to the client machine.

4. The method recited in claim 2, wherein the quality metric information includes a plurality of quality metrics, and wherein each base layer video data segment is associated with a respective one of the plurality of quality metrics.

5. The method recited in claim 1, wherein the prioritization data is determined at least in part based a relative importance associated with different portions of the media content item.

6. The method recited in claim 1, the method further comprising:
   determining whether the second quality level satisfies a designated quality threshold value, wherein the side channel video data is transmitted to the client machine until the designated quality threshold value is satisfied.

7. The method recited in claim 1, wherein the media content item corresponds to a video requested for downloading by the client machine.

8. A system comprising:
   one or more processors operable to:
      identify base layer video data including a plurality of base layer video data segments, the base layer video data segments capable of being used to present a media content item at a first quality level,
      retrieve side channel video data including a plurality of side channel video data segments for transmission to a client machine, each side channel video data segment corresponding with a base layer video data segment, the side channel video data segments capable of being combined with the corresponding base layer video data segments to present the media content item at second quality level, the second quality level being greater than the first quality level, and
      determine prioritization data for the side channel video data segments, the prioritization data designating an ordering for transmitting the side channel video segments to the client machine, wherein the prioritization data is determined at least in part based on one or more characteristics associated with a content management account, the content management account being associated with the client machine;
   a storage medium operable to store the base layer video data and the side channel video data; and
   a communications interface operable to transmit the base layer video data and the side channel video data to a client machine in accordance with the prioritization data.

9. The system recited in claim 8, wherein the prioritization data is determined at least in part based on quality metric information, and wherein the quality metric information characterizes the quality of the media content item based on the data layer data transmitted to the client machine.

10. The system recited in claim 9, wherein the quality metric information also characterizes the quality of the media content item based on the side channel video data transmitted to the client machine.

11. The system recited in claim 9, wherein the quality metric information includes a plurality of quality metrics, and wherein each base layer video data segment is associated with a respective one of the plurality of quality metrics.

12. The system recited in claim 8, wherein the processor is further operable to determine whether the second quality level satisfies a designated quality threshold value, wherein the side channel video data is transmitted to the client machine until the designated quality threshold value is satisfied.

13. One or more non-transitory computer readable media having instructions stored thereon for performing a method, the method comprising:
   transmitting base layer video data to a client machine, the base layer video data including a plurality of base layer video data segments, the base layer video data segments capable of being used to present a media content item at a first quality level;
   retrieving side channel video data for transmission to the client machine, the side channel video data including a plurality of side channel video data segments, each side channel video data segment corresponding with a base layer video data segment, the side channel video data segments capable of being combined with the corresponding base layer video data segments to present the media content item at second quality level, the second quality level being greater than the first quality level;
   determining prioritization data for the side channel video data segments, the prioritization data designating an ordering for transmitting the side channel video data segments to the client machine, wherein the prioritization data is determined at least in part based on one or more characteristics associated with a content management account, the content management account being associated with the client machine; and
   transmitting the side channel video data segments in accordance with the prioritization data.

14. The one or more non-transitory computer readable media recited in claim 13, wherein the prioritization data is determined at least in part based on quality metric information, and wherein the quality metric information characterizes the quality of the media content item based on the data layer data transmitted to the client machine.

* * * * *